Oct. 23, 1956  W. W. SPOONER  2,767,668
BAKING OF FOOD PRODUCTS
Filed Aug. 21, 1951  5 Sheets-Sheet 1
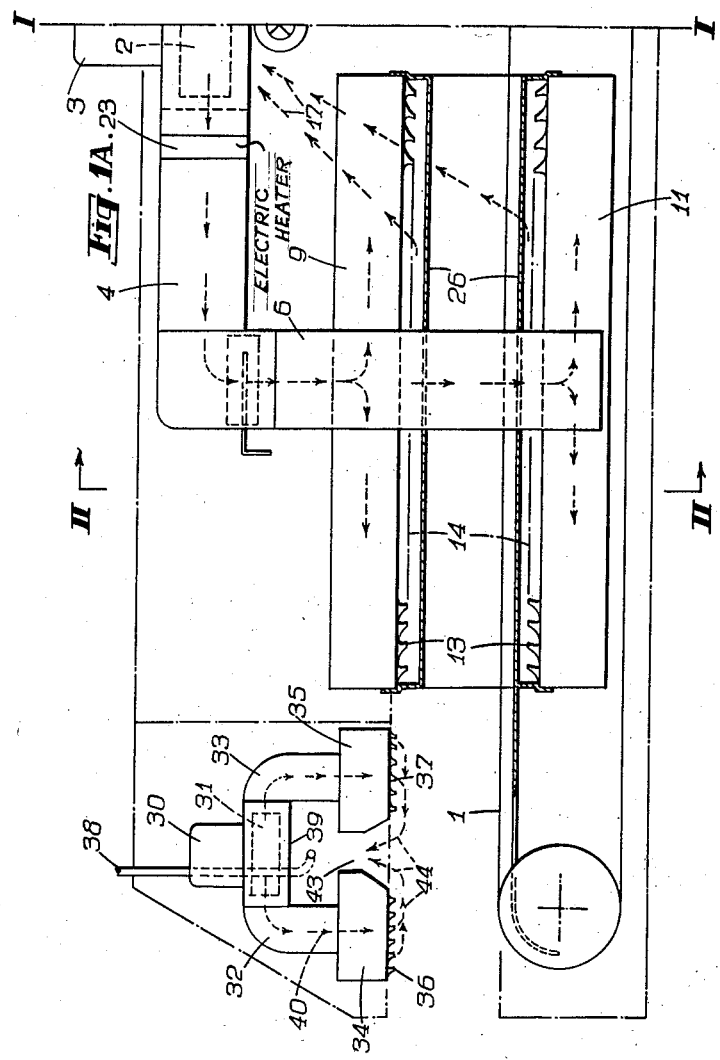
William Wycliffe Spooner Inventor

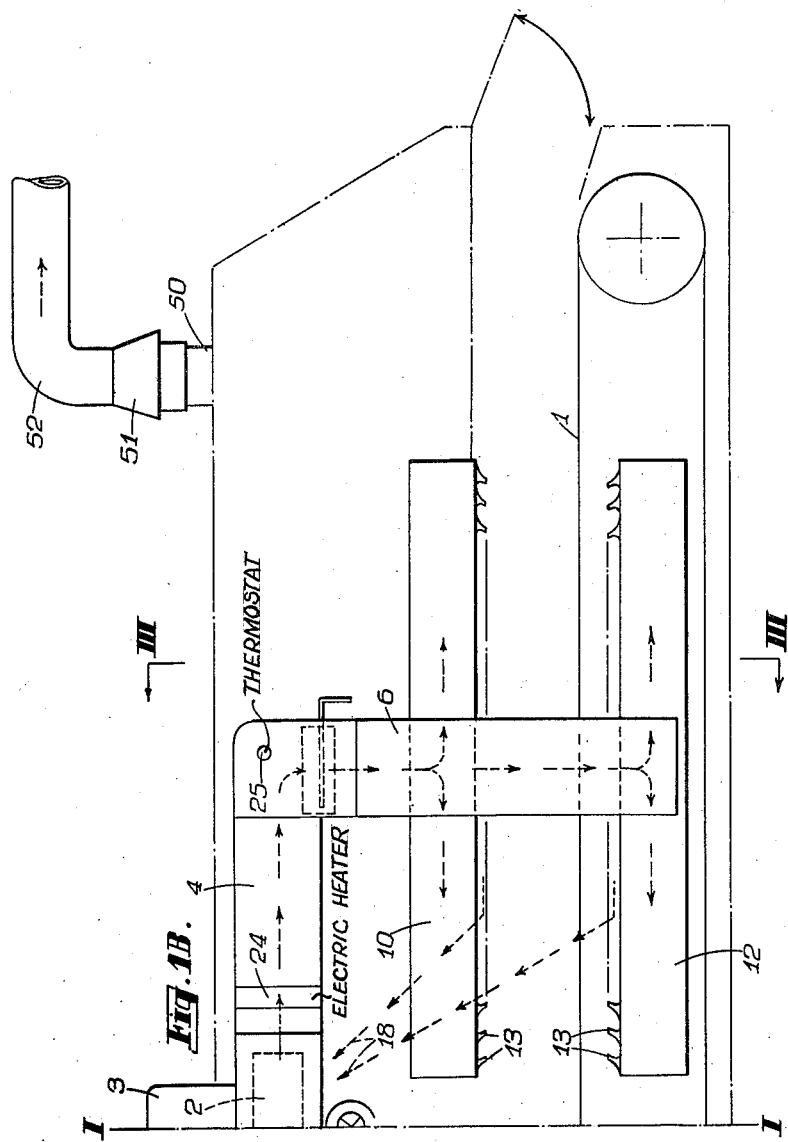

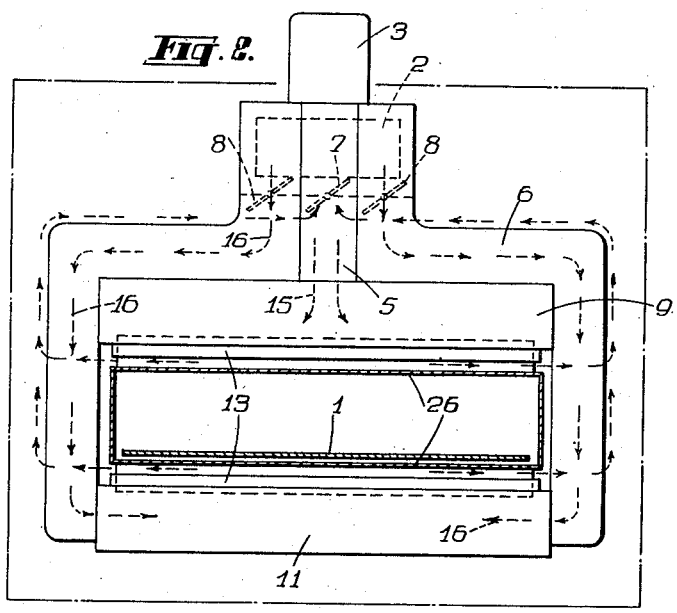
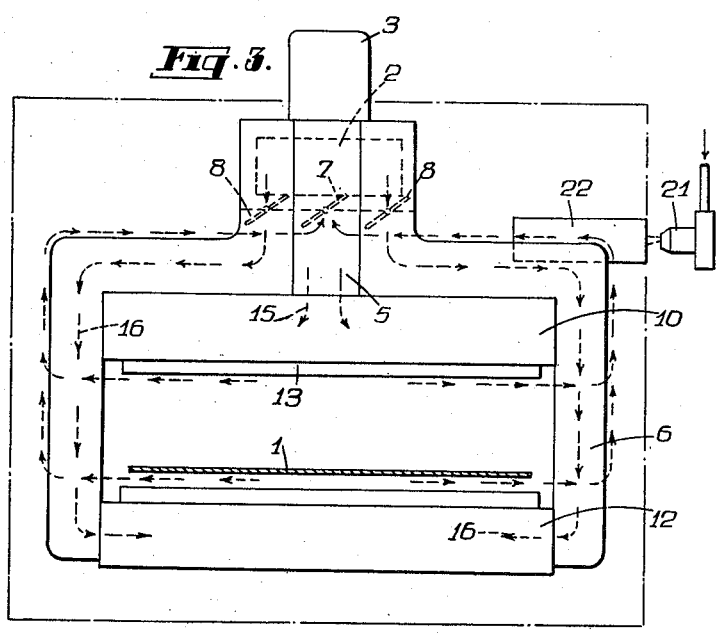

Oct. 23, 1956     W. W. SPOONER     2,767,668
BAKING OF FOOD PRODUCTS
Filed Aug. 21, 1951     5 Sheets-Sheet 4
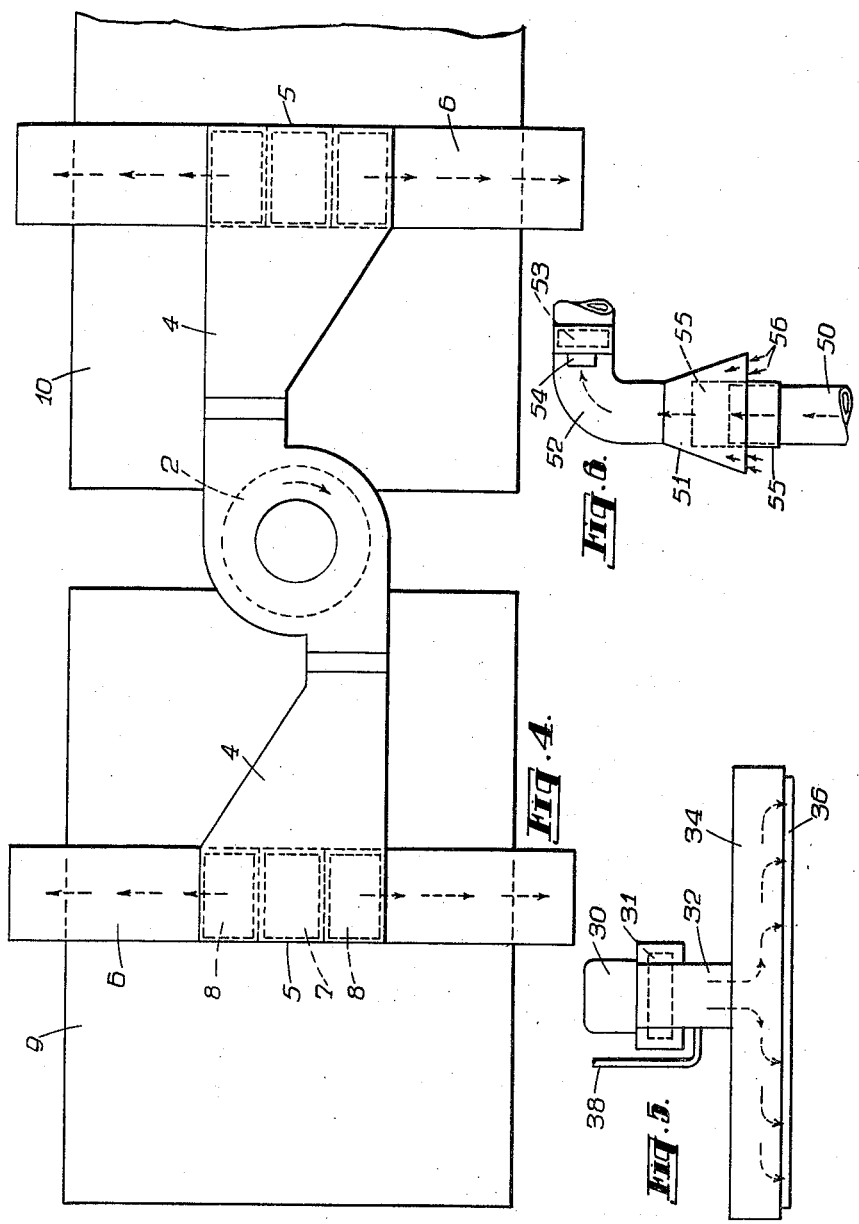

Oct. 23, 1956   W. W. SPOONER   2,767,668
BAKING OF FOOD PRODUCTS
Filed Aug. 21, 1951   5 Sheets-Sheet 5
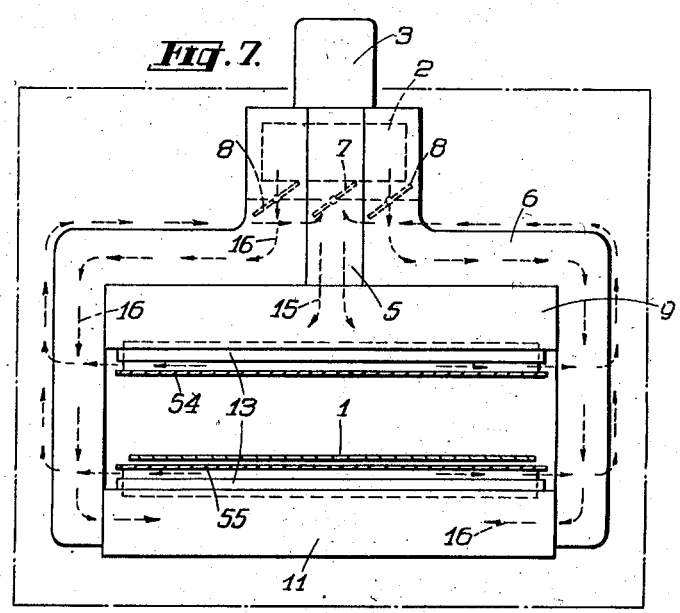
Inventor
WILLIAM WYCLIFFE SPOONER
By
Attorney

United States Patent Office 2,767,668
Patented Oct. 23, 1956

2,767,668

BAKING OF FOOD PRODUCTS

William Wycliffe Spooner, Ilkley, England, assignor to Spooner Food Machinery Engineering Company Limited, Ilkley, England, a British company Application August 21, 1951, Serial No. 242,943

Claims priority, application Great Britain August 22, 1950

22 Claims. (Cl. 107—54)

The present invention relates to the baking of food products in an oven and is especially applicable to the baking of goods such for examples as bread, pies, cake and the like in which a crust or browning of the exterior is desired.

Many baker's ovens rely chiefly on radiant heat, some relay on a combination of radiant heat and conduction of heat and in some ovens forced convection has been introduced to a limited extent. Convection however has only been introduced or proposed as an auxiliary to radiation and/or conduction and has been for the purpose of avoiding local temperature irregularities or for achieving an increase of top heat or bottom heat.

According to the present invention the food product to be baked in a baking oven is heated chiefly or almost entirely by forced convection so that the heat is applied primarily to the product to be baked and only secondarily and incidentally to the oven itself.

An important feature of the invention consists in that the gaseous medium employed for the forced convection is caused to circulate in a closed circuit and whilst so circulating is projected in jets upon the food product. It may also be projected in jets upon a shelf or conveyor on which the food product is supported in the oven.

Thus the product may be heated entirely or almost entirely by jets of a gaseous heating medium which are projected onto the product from above and if desired on to its support from below.

Whilst the invention can be applied to ovens in which the food product is baked while stationary and to continuous ovens of the so-called swing-tray type for example in which the food product is traversed on a conveyor through two or more flights one above the other, the invention is most advantageously applicable to straight through or tunnel ovens in which the food product is conveyed through the oven in a single flight and in which the roof of the tunnel may in effect be constituted by a pressure chamber or a series of pressure chambers to which gaseous heating medium is supplied by a fan and the lower face of which has nozzles formed therein for projection of jets of the gaseous medium onto the food product on the conveyor.

The temperature of the gaseous convection medium may be maintained by one or more gas or oil burners or by an electrical heating device or alternatively by a supply to the closed circuit of additional gaseous heating medium at an appropriate temperature. The temperature of the gaseous medium in the closed circuit may be controlled automatically by means of a thermostat.

A further feature of the invention consists in that the gaseous medium is kept at a relatively low temperature of the order of 300° F. to 475° F. and preferably of the order of 300° to 400° F. so that the risk of charring of the goods is reduced or even eliminated, even when the baking period is prologned substantially beyond the normal period.

A further feature of the inventon consists in projecting the gaseous medium towards the path of travel of the goods (i. e. the food product) in relatively closely spaced jets, which are allowed to impinge and are then almost immediately withdrawn from the goods or from a heating surface adjacent the goods. The jets are preferably projected through convergent slit-like nozzles extending traversely across the path of travel of the goods and spaced apart longitudinally of the path of travel by relatively short distances, the individual jets being adapted to impinge over a distance less than the longitudinal spacing of the nozzles and being then immediately withdrawn between the nozzles in the transverse direction.

Preferably the nozzles are spaced in the longitudinal direction of the conveyor by distances not greater than five times the maximum dimension of the nozzles in said longitudinal direction.

A further feature of the invention consists in circulating the gaseous medium in closed circuit with a relatively high volume rate of flow to cause the gaseous medium to impinge upon the food product at high velocity and to cause each element of the gaseous medium to be recirculated a large number of times whereby the temperature drop of the gaseous medium at each impingement is low and of the order of say 2° F. up to 20° F. whilst the volume rate of flow of the gaseous medium in the closed circuit is a relatively large multiple of the rate of inflow of fresh gaseous medium into the circuit. For example, the volume rate of flow may be of the order of 20 to 100 times the rate of flow of the gaseous medium into the system. A further feature of the invention consists in circulating the gaseous medium in the closed circuit at a volume rate of flow per minute which is high, for example a multiple of between from about 10 to about 100 times, as compared with the total volume of the gaseous medium in the system. Since the volume of the baking chamber is about one-fourth or one-fifth of the volume of the closed circuit, the volume rate of flow per minute will be from about 40 or 50 up to about 400 or 500 times the volume of the baking chamber.

The gaseous medium employed for achieving the forced convection heating according to the present invention may conveniently be air or air with a small content of combustion products.

Since the temperature of the gaseous medium may be thermostatically controlled it will be appreciated that the relatively low temperature drop of the gaseous medium over each cycle of its flow (of the order of 2° up to 20° F. as referred to above) and the relatively small quantity of the medium in the cycle as compared with the rate of flow will enable an extremely sensitive and rapid thermostatic control to be achieved.

In the baking of most food products there is an optimum temperature which should be maintained for achieving the best results or for achieving a particular result but in the past it has usually been necessary to exceed the optimum temperature in order to achieve a sufficient input of heat into the product. Thus an important feature of the present invention is that the optimum temperature can be fairly closely maintained by suitable control of the temperature of the gaseous medium whilst the rate of input of heat into the product to be baked or in course of baking can be adjusted by adjustment of the volume rate of flow of the gaseous medium per unit time. Thus according to the present invention the ideal temperature condition can be fairly closely maintained without prejudice to the rate of heat input and the overall rate of baking. Likewise by using suitable thermostatic control the temperature can be maintained substantially at the optimum temperature irrespective of the load on the oven so that the speed of the conveyor can be varied and the spacing of the elements to be baked on the conveyor can be varied without any material temperature variation.

Most ovens require a substantial warming-up period before baking can proceed but in the present invention the warming up period can be reduced to a very small period. Moreover many ovens have to be warmed-up to a temperature substantially above the optimum temperature to enable them to withstand the shock of a suddenly applied baking load. This difficulty is eliminated by the present invention.

A further advantage of the present invention is that the oven can be lightly constructed insofar as there is no need to provide brickwork therein for the storage of heat against a suddenly applied baking load. Thus ovens according to the present invention may be installed on floors which might be insufficiently strong to support heavier ovens.

In eliminating drop in the oven temperature as the load comes on, the oven heat of an oven constructed in accordance with the present invention can be considered as being completely solid in effect. In the conventional type of oven the refractory lining or other radiating surfaces have initially to be raised to a temperature considerably higher than the true baking chamber temperature in order to withstand the chilling effect of the first batch of goods at the beginning of a run. As a result, the first few rows of the product are overbaked or burnt and the same process is repeated each time there is a break in production. This phenomenon is commonly called "flash heat". In an oven constructed in accordance with the teaching of the present invention, this does not happen because the source of heat is the circulating air and the heat of the oven structure is only incidental. Thus, once the air is up to temperature, baking can start and this stage can be reached in half an hour or less from cold, i. e. long before the oven structure is up to temperature generally. The air is circulating at a rapid rate, within a range from about 10 to about 100 times the volume of the closed circuit of the system per minute. Therefore, a second or two after the goods first enter the oven, the burner operating under control of the thermostat comes on to high flame. The high flame jet is more than adequate to restore immediately any drop in the circulating air temperature produced by the goods. Thus, the heat is completely solid in its effect and is unaccompanied by flash heat. A few loads of biscuits may be put through the oven for test purposes with certainty that identical results will be achieved when the oven is later in full production.

In constructing an oven according to the present invention relative short ducts for the gaseous medium should be used so as to minimise the total volume of the gaseous medium in circulation as compared with its volume rate of flow. This, combined with the fact that the temperature of the gaseous medium can be kept relatively low, results in very low heat losses from the oven, facilitates temperature control and the maintenance of a relatively constant temperature with varying load. Likewise it facilitates increase or decrease of oven temperature to suit different products.

The rate of bottom heat input as compared with top heat input may be controlled by a suitable damper arrangement. For example the top and bottom nozzles may be formed in the opposite walls of opposed chests or pressure chambers, and ducts connecting the chests may be provided with suitable dampers to enable the volume rate of flow from one chest to be varied as compared with that of the other.

Usually the fan will be mounted above the upper chest so as to deliver firstly to the upper chest and then through connecting ducts to the lower chest and the installation may be such that the lower chest may be adapted to deliver a greater volume of the gaseous medium than the upper chest except when throttled down by dampers in the connecting ducts.

When the invention is used in conjunction with a gas or oil burner or in conjunction with products of combustion from a separate source of heat, the high circulation rate of the gaseous medium cools the products of combustion, thus preventing local overheating and avoiding undue heat losses from the oven. Since the invention can be carried into practice with the gaseous medium at relatively low temperature, substantial quantities of excess air can be introduced into the oven so that the carbon dioxide content in the gaseous medium can be kept low and carbon monoxide can be substantially completely avoided. Thus the gaseous medium on discharge from the oven can be used for space heating and a further feature of the invention consists in using such gaseous medium for space heating, if necessary with the addition of further air for dilution thereof.

Since the gaseous heating medium of relatively low temperature can be used, the present invention enables an oven to be built so as to suffer relatively small heat losses while operating under optimum temperature conditions to suit the product to be baked with adequate control over the heat input whereby the overall baking time of a particular product may in most cases be substantially less than is required in conventional ovens.

An important result of this system of baking is that a loaf of bread, for example, retains its crusty freshness much longer than one baked in a conventional oven.

In an oven as described above in which the goods being baked are bread or like products which are required to rise or expand in volume in the course of baking, it is desirable to incorporate a further feature of the present invention. This feature consists in shielding the goods to be baked from the jets of gaseous medium over an initial section of their path of travel by means of a tunnel surrounding the path of travel of the goods and through which the goods pass in the initial section of the oven. Instead of a tunnel, upper and lower shielding plates may be employed and the tunnel or plate material is such that it is capable of radiating heat onto the goods as they pass through the initial section of the oven. Thus the oven according to the present invention may embody two sections, in the first of which the jets of gaseous medium will impinge on the shielding tunnel or plates through which heat will be radiated to the goods and in the second and longer section of which the upper jets of the gaseous medium will impinge directly on the goods whilst the lower jets will usually impinge on the conveying means or on the containers in which the goods are baked.

The indirect heating of the goods in the initial section as referred to above will apply a cooking heat which will not encrust the surface of the goods but will allow a free expansion or raising of the goods, the encrustment taking place after the goods have left the initial section.

The length of the said initial section of the oven as compared with the total length of the oven should be in the same ratio as the time required for the product to reach its optimum volume to the total baking time.

In many ovens it is necessary, as hereinbefore explained, to use a temperature higher than the optimum temperature in order to ensure a sufficient input of heat to the products being baked. This relatively high temperature is always attended with the risk of burning of the crust and of producing what is known as a "flying top" whereby the top crust of the loaf tends to part from the remainder. To avoid this difficulty some bakers flood the oven with steam which often results in a leathery crust.

By using a thermostatic control the temperature in the initial section of the oven, that is to say, beneath the shielding plate or within the tunnel can be kept at the optimum and relatively low temperature which is required to enable the product to rise to its optimum volume without encrustment and as described above this optimum temperature can be maintained fairly closely under all conditions of load and conveyor speed.

A further feature of the invention consists in the application of steam to the goods in the early part of the initial section of the oven referred to above. Thus steam may be introduced into the inlet end of a tunnel constituting the aforementioned initial section of the oven.

The steam is preferably projected onto the goods by a nozzle or nozzles and circulated in a closed circuit so as to keep the steam in a limited locality of the initial section of the oven. Thus the steam nozzle or nozzles may be arranged within the tunnel referred to above adjacent the inlet end thereof. The use of steam as herein described enables the starch cells of the surface of the goods to be broken down whereby to produce a baked product with a smooth and shiny surface. It also facilitates the volume increase or rising of the product to its optimum volume since it keeps the skin of the product in course of baking in a plastic condition.

The circulation of the steam in a closed circuit, that is, its projection onto the goods by means of a fan and withdrawal from the goods by the fan for recirculation, enables the steam to be kept in a limited locality of the oven and thus results in considerable economy since the steam is not dispersed over the whole of the oven, as occurs in many other types of oven. Thus with the present invention there is no necessity to employ steam traps or other devices for localising the steam.

Moreover the invention enables a loaf to be produced in a straight through travelling oven which has a thin crisp crust with absence of the tough leathery undercrust associated with prolonged steaming.

The invention is further described by way of example with reference to the accompanying somewhat diagrammatic drawings which illustrate the application of the invention to a straight through or tunnel oven and in which:

Figs. 1A and 1B are the left and right hand parts respectively of a side elevation taken on opposite sides of a line I—I.

Fig. 2 is a sectional view taken on the line II—II of Fig. 1A.

Fig. 3 is a sectional view of the right hand part of Fig. 1 taken on the line III—III of Fig. 1B.

Fig. 4 is a plan view corresponding to parts of Figs. 1A and 1B.

Fig. 5 is a side view showing a part of Fig. 1A.

Fig. 6 is a view of a detail shown in Fig. 1B and

Fig. 7 is a view similar to Fig. 2 illustrating an alternative arrangement.

Referring to Fig. 1 the upper run of the conveyor 1 is adapted to move from left to right as viewed in Fig. 1. A fan 2 driven by an electric motor 3 is connected at its discharge side to two ducts 4 adapted to feed a gaseous heating medium discharged by the fan through ducts 5 to upper pressure chambers 9, 10 located above the upper run of conveyor 1 and through ducts 6 to opposite sides of two lower pressure chambers 11, 12 located below the upper run of conveyor 1.

The flow of the gaseous medium through the ducts 5 is controlled by a damper 7 and that through ducts 6 by dampers 8 which may be coupled together for common displacement.

The pressure chambers have nozzles 13 formed in the walls thereof nearest to the conveyor. Each pressure chamber has two groups of nozzles which are oppositely inclined towards one another. Only a few nozzles 13 are actually shown in Fig. 1 but in practice the nozzles 13 are provided over substantially the whole face of each pressure chamber, the level of the nozzle tips being indicated by the line 14.

Thus gaseous medium discharged by the fan passes through the ducting 5, 6 and into the pressure chambers 9, 10 and 11, 12 as indicated by the arrows 15, 16 and is projected through the nozzles 13 towards opposite sides of the conveyor 1 and thereupon returns to the inlet side of the fan as indicated by the arrows 17, 18 so as to circulate in closed circuit. The opposite inclination of the groups of nozzles 13 tends to keep the gaseous medium within the lengths of the pressure chambers and thus tends to minimize spillage of the gaseous medium at the left hand end of the pressure chambers 9, 11 and at the right hand end of the pressure chambers 10, 12.

The reference numeral 21 (Fig. 3) indicates a gas or oil burner the flame of which extends into a tubular inlet 22 formed in the side wall of the oven casing whereby to maintain the temperature of the circulating gaseous medium. Reference numerals 23, 24 indicate electric heaters which may be inserted in the ducting 4 at positions near to the discharge of the fan 2 as an alternative to a gas or oil burner.

A thermostat for automatically controlling the gas or oil burner 21 or for controlling the electric heaters 23, 24 and thus the temperature of the circulating gaseous medium is indicated at 25 (Fig. 1B).

For the purpose of moderating the temperature to which the food product is subjected in the early part of the oven and to enable the product to raise before a crust is formed thereon a heat conducting shield 26, preferably in the form of a tunnel of rectangular cross section, is provided between the pressure chambers 9, 11 so as to prevent the gaseous medium from impinging upon the conveyor and the food product thereon. It is desirable that the shield should extend up to the left hand end of the pressure chambers 9, 11 but it need not extend so far as the right hand end of said pressure chambers if a shorter length of shield would permit of adequate time for expansion of the food product having regard to speed of movement of the conveyor, the rate of heat input into the oven and the temperature of the gaseous medium.

In any particular oven there may be a plurality of oven sections each consisting of a pair of upper pressure chambers and a pair of lower pressure chambers and a common fan. The shield 26 will usually only be provided either in the first section or between the first two pressure chambers 9, 11 of the first section so that in the subsequent passage of the food products through the oven the heating medium will impinge directly upon the food products and on the under side of the conveyor.

It will be observed that the nozzles 13 are of slit-like form extending transversely across the conveyor and are of convergent form towards the conveyor.

A unit for applying steam to the food product before it enters the oven is shown at the entrance to the oven at the left hand side of Fig. 1. The steaming unit embodies a motor 30 driving a fan 31 which communicates through ducts 32, 33 at the discharge side thereof with pressure chambers 34, 35 each provided with convergent slit-like nozzles 36, 37 extending transversely across the path of travel of the conveyor. It will be noted that the nozzles 36, 37 are oppositely inclined to the right and left respectively.

Steam is fed through a pipe 38 to the inlet side 39 of the fan 31.

The fan thus circulates the steam through the ducts 32, 33 and pressure chambers 34, 35 as indicated by the arrows 40 and the steam is projected in jets from the nozzles 36, 37 whereupon the steam returns to the inlet side 39 of the fan as indicated by the arrows 44 through a return opening 43 between the pressure chambers, 34, 35.

The capacity of the fan 2 per minute should be greater than, and preferably a substantial multiple of, the total volume of gaseous medium flowing in the closed circuit. Thus, the fan 2 should have a volume rate of flow per minute from about 10 to about 100 times the total volume of the gaseous medium flowing in the closed circuit. Likewise, the capacity of the fan 31 per minute should be greater than, and preferably a substantial multiple of, the total volume of steam in the steam circuit.

The spillage of gaseous medium from the oven is discharged from the oven casing through a duct 50 which as shown in Fig. 6 enters into the bell mouthed end 51 of the second duct 52 within which is housed a fan 53 driven by an electric motor 54. A regulator sleeve 55 surrounding the duct 50 is movable in an axial direction to control the rate of ingress of diluent air into the duct 52 as indicated by the arrows 56. The mixture of gaseous medium and air is fed to a space heating installation and the fan 53 thus performs the dual function of inducing diluent air into the duct 52 and of feeding the mixture to the space heating installation.

Fig. 7 illustrates an alternative arrangement in which instead of providing a heat conducting metal shield 26 in the form of a tunnel to moderate the heating of the food products in the early part of the oven, heat conducting plates 54 and 55 are arranged respectively above and below the conveyor 1 to shield the food products and the conveyor 1 from the direct impingement thereon of gaseous medium issuing from the pressure chambers 9, 11, respectively.

I claim:

1. An apparatus for baking dough products comprising a conveyor, means to move said conveyor in a substantially horizontal path throughout a portion of its travel, spaced apart opposed upper and lower walls, said substantially horizontal path of conveyor travel being located between said upper and lower walls and said walls having means therein to direct heated fluid toward said conveyor as it travels along said substantially horizontal path of travel, means to force said heated fluid repeatedly through said directing means, a plate of heat conductive material located between said conveyor and said upper heated fluid directing means throughout an initial portion of said horizontal path of travel, and another plate of heat conductive material located between said conveyor and said lower heated fluid directing means throughout said initial portion of said horizontal path of travel, said respective plates being located in opposed relation whereby said conveyor is shielded during said initial portion of travel from heated fluid coming from above and below it but is subject to radiant heat from said plates.

2. An apparatus for baking dough products comprising a conveyor, means to move said conveyor in a linear path of travel, spaced apart opposed walls, said linear path of travel of the conveyor being located between said opposed walls and said walls having means therein to direct heated fluid toward said conveyor as it travels along said linear path of travel, means to recirculate said heated fluid, and a tunnel of heat conductive material surrounding said conveyor and being located between said opposed walls throughout an initial portion of said linear path of travel whereby said conveyor is shielded during said initial portion of travel from heated fluid coming from said opposed walls but is subject to radiant heat from said tunnel.

3. An apparatus for baking dough products comprising a conveyor, means to move said conveyor in a linear path of travel, spaced apart opposed walls, said linear path of travel of the conveyor being located between said opposed walls and said walls having means comprising nozzles extending across the path of travel of said conveyor to direct heated fluid toward said conveyor as it travels along said linear path of travel, means to force said heated fluid repeatedly through said nozzles, and a tunnel of heat conductive material surrounding said conveyor and being located between said opposed walls throughout an initial portion of said linear path of travel whereby said conveyor is shielded during said initial portion of travel from heated fluid coming from said nozzles but is subject to radiant heat from said tunnel.

4. An apparatus for baking dough products comprising a conveyor, means to move said conveyor in a substantially horizontal path throughout a portion of its travel, spaced apart opposed upper and lower walls, said substantially horizontal path of conveyor travel being located between said upper and lower walls and said walls having nozzles extending across and spaced longitudinally of said path of travel to direct heated fluid toward said conveyor as it travels along said substantially horizontal path of travel, means to force said heated fluid through said directing means, a plate of heat conductive material located between said conveyor and said upper heated fluid directing means throughout an initial portion of said horizontal path of travel, and another plate of heat conductive material located between said conveyor and said lower heated fluid directing means throughout said initial portion of said horizontal path of travel, said respective plates being located in opposed relation whereby said conveyor is shielded during said initial portion of travel from heated fluid coming from above and below it but is subject to radiant heat from said plates.

5. A baking oven comprising a casing enclosing a baking chamber, an oven conveyor extending through said baking chamber, at least one pair of opposed pressure chambers, one above and one below the conveyor, with nozzles formed in the walls thereof facing the conveyor, a fan communicating at its inlet side with said baking chamber and at its discharge side with said pressure chambers to cause a heated fluid to circulate in a closed circuit through the fan to said pressure chambers, through the pressure chamber nozzles into the baking chamber towards the conveyor and thence back to the fan, means located in the vicinity of the closed circuit of the circulating fluid for heating the fluid, and a tunnel of heat conductive material surrounding said conveyor and being located between said upper and lower pressure chambers throughout an initial portion of the path of travel of the conveyor through the baking chamber whereby said conveyor is shielded during said initial portion of travel from heated fluid coming from said nozzles but is subject to radiant heat from said tunnel.

6. A baking oven according to claim 5 provided with a steaming unit located near to the entrance to the oven and comprising a pressure chamber located adjacent to the oven conveyor and formed with nozzles in a wall thereof adjacent to the conveyor, said nozzles being directed towards the conveyor, a fan communicating at its suction side with the steaming locality and communicating at its discharge side with said pressure chamber whereby to cause steam to circulate in closed circuit through said chamber and nozzles and back to the fan, and means for feeding a steam supply into the closed circuit to make good the steam losses therefrom.

7. A baking oven according to claim 5 including a discharge duct for withdrawal of heating medium from the oven and means for controllably supplying air for admixture with the gaseous heating medium so discharged to enable the discharged heating medium to be used for space heating.

8. A baking oven according to claim 5 in combination with a space heating installation fed with gaseous heating medium therefrom.

9. A baking oven according to claim 5 including a thermostat for controlling said heating means in order to keep the temperature of the circulating fluid within given limits.

10. A baking oven as claimed in claim 5 wherein the means for heating the fluid comprises an electric resistance element in said closed circuit.

11. A baking oven as claimed in claim 5 wherein the means for heating the fluid comprises a burner directed into said closed circuit.

12. A baking oven comprising a casing enclosing a baking chamber, an oven conveyor extending through said baking chamber, a plurality of pairs of opposed pressure chambers, one pressure chamber of each pair located above and the other pressure chamber of each pair located below the conveyor, said pressure chambers having nozzles formed in the walls thereof facing the conveyor, a fan communicating at its inlet side with said baking chamber and at its discharge side with said pressure chambers to cause heated fluid to circulate in a closed circuit through the fan to said pressure chambers, through the pressure chamber nozzles into the baking chamber towards the conveyor and thence back to the fan, means located in the vicinity of the closed circuit of the circulating fluid for heating the fluid, a metallic shield located between the upper pressure chamber of at least the first pair of pressure chambers and the conveyor, and another metallic shield located between the lower pressure chamber of at least the first pair of pressure chambers and the conveyor, said metallic shields being of heat conducting material whereby the heating fluid from the nozzles is prevented from impinging directly upon the dough products and made to heat the metallic shields to cause the dough products to be baked more slowly in the initial part of the path of travel of the conveyor through the baking chamber than in a later part of said path of travel.

13. A baking oven comprising a plurality of baking chambers, an oven conveyor extending through said baking chambers, at least one pair of opposed pressure chambers, one above and one below the conveyor in each of said baking chambers, nozzles formed in the walls of said pressure chambers facing the conveyor, a fan communicating at its inlet side with said baking chamber and at its discharge side with said pressure chambers to cause a heated fluid to circulate in a closed circuit through the fan to said pressure chambers, through the pressure chamber nozzles into the baking chamber towards the conveyor and thence back to the fan, means located in the vicinity of the closed circuit of the circulating fluid for heating the fluid, a metallic shield located between the upper pressure chamber and the conveyor of at least the first pair of pressure chambers of the first baking chamber, and another metallic shield located between the lower pressure chamber and the conveyor of at least the first pair of pressure chambers of the first baking chamber, said metallic shields being of heat conducting material whereby the heating fluid from the nozzles is prevented from impinging directly upon the dough products and made to heat the metallic shields to cause the dough products to be baked more slowly in the initial part of the path of travel of the conveyor through the baking chamber than in a later part of said path of travel.

14. A baking oven according to claim 13 including means for controlling the relative rates of circulation of heated fluid in the individual baking chambers and damper means for controlling the relative rates of fluid projection from the upper and lower pressure chambers.

15. A baking oven comprising a casing enclosing a baking chamber, an oven conveyor extending through said baking chamber, at least one pair of opposed pressure chambers, one above and one below the conveyor each with a plurality of nozzles formed in the walls thereof facing the conveyor, said nozzles being of slit-like form and extending across the path of travel of the conveyor and being spaced from one another in the longitudinal direction of the conveyor, a fan communicating at its inlet side with said baking chamber and at its discharge side with said pressure chambers to cause a heated fluid to circulate in a closed circuit through the fan to said pressure chambers, through the pressure chamber nozzles into the baking chamber towards the conveyor in the form of a plurality of streams and thence back to the fan, means located in the vicinity of the closed circuit of the circulating fluid for heating the fluid, a metallic shield extending over at least an initial portion of the path of travel of the conveyor through the baking chamber and located between the upper pressure chamber and the conveyor, and another metallic shield extending over said initial portion of the path of travel of the conveyor through the baking chamber and located between the lower pressure chamber and the conveyor, said metallic shields being of heat conducting material whereby the heating fluid from the nozzles is prevented from impinging directly upon the dough products and made to heat the metallic shields to cause the dough products to be baked more slowly in the initial part of the path of travel of the conveyor through the baking chamber than in a later part of said path of travel.

16. A baking oven according to claim 15 in which said nozzles are relatively short in the longitudinal direction of the conveyor and are of convergent form towards the conveyor.

17. A baking oven according to claim 15 including damper means for controlling the relative rates of circulation of heated fluid through the upper and lower pressure chambers.

18. A method of baking food products mainly by forced convection which comprises the steps of moving said food products along a given path, projecting steam toward and onto said food products in an initial portion of said path, projecting heated fluid toward said food products from above and below in a subsequent portion of said path, recirculating said projected heated fluid in a closed circuit, the volume rate of flow per minute of heated fluid in said closed circuit being in the range from about 10 to about 100 times the volume of the heated fluid in said closed circuit, and recirculating said steam in a closed circuit, the volume rate of flow per minute of said steam in said last named closed circuit being a substantial multiple of the volume of said steam in said last named closed circuit.

19. Apparatus for baking food products by forced convection comprising a conveyor, means to move said conveyor along a given path of travel, spaced apart opposed walls of substantially equal area defining a baking zone having an entrance and an exit, said given path of travel of said conveyor passing between said opposed walls and through said baking zone from said entrance to said exit, each of said walls having two groups of nozzles which are oppositely inclined toward one another to direct heated fluid toward said conveyor as it travels along said path and through said baking zone, said nozzles being spaced along the length of said baking zone from adjacent said entrance to adjacent said exit, the nozzles adjacent said entrance and said exit being inclined toward the center of said baking zone, a fan connected to cause heated fluid to circulate in a closed circuit through the fan, through said nozzles toward the conveyor, and then back to the fan, said fan and said nozzles having a volume rate of flow per minute capacity such as to permit a volume rate of flow per minute which is in the range from about ten to about one hundred times the total volume of said closed circuit, and means associated with said closed circuit for heating said fluid directly as said fluid recirculates in said closed circuit.

20. An apparatus according to claim 19, including a steaming unit located in advance of and adjacent to the entrance to said baking zone, said steaming unit including means to project steam toward the food products carried by said conveyor whereby said food products are steamed prior to being heated by said heated fluid.

21. An apparatus for baking food products mainly by forced convection comprising a conveyor, means to move said conveyor along a given path of travel, spaced apart opposed walls, said given path of travel of said conveyor passing between said oppose dwalls and said walls each having converging nozzles projecting therefrom to direct heated fluid towards said conveyor as it travels along said path, shielding means located between said conveyor and said nozzles in an initial portion of the path of travel of said conveyor to shield food products carried by said conveyor from said projected fluid during travel of said food products through said initial portion of said path, a fan connected to cause said heated fluid to circulate in a closed circuit through the fan, through said nozzles toward the conveyor, and then back to the fan, said fan and said nozzles having a volume rate of flow per minute capacity such as to permit a volume rate of flow per minute which is in the range from about ten to about one hundred times the total volume of said closed circuit, and means associated with said closed circuit for heating said fluid directly as said fluid recirculates in said closed circuit.

22. An apparatus according to claim 21, wherein said shielding means is a metallic tunnel through which said conveyor passes in traveling along said initial portion of said path of travel, and said metallic tunnel is heated by projected fluid to radiate heat toward said conveyor as said conveyor travels along said initial portion of said path of travel.

References Cited in the file of this patent

UNITED STATES PATENTS

| Number | Name | Date |
|---|---|---|
| 784,854 | Grace | Mar. 14, 1905 |
| 982,665 | Gantvoort | Jan. 24, 1911 |
| 1,890,681 | Hoppe | Dec. 13, 1932 |
| 1,971,766 | Byron et al. | Aug. 28, 1934 |
| 2,002,976 | Byron | May 28, 1935 |
| 2,060,430 | Spooner | Nov. 10, 1936 |
| 2,074,744 | Faucher | Mar. 23, 1937 |
| 2,141,591 | Bonner | Dec. 27, 1938 |
| 2,286,049 | Baker | June 9, 1942 |
| 2,501,765 | Dumbleton et al. | Mar. 28, 1950 |

FOREIGN PATENTS

| Number | Country | Date |
|---|---|---|
| 553,807 | Great Britain | June 7, 1943 |
| 965,635 | France | Feb. 22, 1950 |